United States Patent [19]
Le Van Suu

[11] Patent Number: 5,406,248
[45] Date of Patent: Apr. 11, 1995

[54] METHOD AND APPARATUS FOR MANAGING INFORMATION TRANSMISSIONS ON AN ELECTRICAL DISTRIBUTION CIRCUIT

[75] Inventor: Maurice Le Van Suu, Romainville, France

[73] Assignee: SSG-Thomson Microelectronics S.A., France

[21] Appl. No.: 903,516

[22] Filed: Jun. 24, 1992

[30] Foreign Application Priority Data

Jun. 24, 1992 [FR] France ................. 91 07739

[51] Int. Cl.[6] ............ H04B 3/00; H04L 27/00
[52] U.S. Cl. ................ 340/310.01; 340/825.5; 370/85.2
[58] Field of Search ........ 340/310 R, 310 A, 310 CP, 340/825.52, 825.5; 370/85.2, 85.3, 85.6

[56] References Cited

U.S. PATENT DOCUMENTS

| | | | |
|---|---|---|---|
| 4,751,701 | 6/1988 | Roos et al. | 340/825.5 |
| 4,797,901 | 1/1989 | Goerne et al. | 340/825.5 |
| 4,860,006 | 8/1989 | Barall | 340/825.5 |
| 5,012,467 | 4/1991 | Crane | 340/825.5 |
| 5,065,153 | 11/1991 | Tomita et al. | 340/825.5 |

FOREIGN PATENT DOCUMENTS 0100494 6/1983 European Pat. Off. .
0217571 9/1986 European Pat. Off. .
2229023 12/1990 United Kingdom .

OTHER PUBLICATIONS

8080 Wescon Technical Papers Oct. 30–Nov. 2, 1984 "Small Area Networks for Personal Computers" by Allin Kingsbury.

Primary Examiner—Donnie L. Crosland
Attorney, Agent, or Firm—Seed and Berry

[57] ABSTRACT

Several communication stations are connected to the electrical distribution circuit and emit on the latter information by injection of carrier currents, in the form of frames comprising a predetermined number of bits emitted sequentially. In the course of the emission of each bit, a bit is received as echo of the emitted bit and the echo bit is compared with the emitted bit. In the event of detection of a collision, the stations involved in said collision are placed in a state of listening for a succession of items of information emitted on the electrical distribution circuit respectively by the other communication stations according to a predetermined order of priority.

6 Claims, 3 Drawing Sheets

METHOD AND APPARATUS FOR MANAGING INFORMATION TRANSMISSIONS ON AN ELECTRICAL DISTRIBUTION CIRCUIT

TECHNICAL FIELD

The present invention relates to a method for managing information transmissions on an electrical distribution circuit.

It aims in particular at a device for implementation thereof and the application of this method to communications in a home system.

BACKGROUND OF THE INVENTION

The transmission of information by carrier currents on home electrical distribution circuits is at the moment instilling profound interest in the present development of home installations.

In a communication system by carrier currents, such as can at the moment be conceived, items of electrical equipment are connected to a mains electrical distribution circuit and can either be intended for receiving commands, or dedicated to the emission of information or of commands intended for items of receiving equipment. The information transmitted is generally digital information resulting from an encoding and from a conditioning of a set of information including one or more addresses, data and monitoring information, the whole constituting a frame which is injected onto the mains by frequency modulation or else amplitude modulation in accordance with well-known techniques. With the present methods of transmission numerous difficulties emerge when several items of emitter equipment are connected up to the electrical distribution circuit at several points of the circuit. Indeed, without special care, the simultaneous emission of information by two emitters or more leads to a collision of the injected frames and to a distortion of the transmitted messages, which may possibly induce inopportune commands and in many cases lead to an absence of correct transmission of information. Thus, the overall reliability of the communication method is severely affected because of the potential risk of collision of information.

In the area of the management of information transmission on a communication medium, the principle is already known of the token ring widespread in local microcomputer networks. With this principle, at any moment, a single microcomputer has the option of emitting information on the network intended for one or more of the other microcomputers connected to the network, and the "token" passes to the next microcomputer in the network, which becomes the new master of the transmission of information on the network. There is thus a collision management of a deterministic nature, which, however, has the disadvantage of leading to a relatively modest information flow by comparison with the limit flows allowed by the usual transmission speeds for this type of transmission.

In the area of communication networks, there also exist methods of bit-by-bit collision detection generally leading to states of arbitration between emitters in the course of which the emitters involved in the collision cease emitting until the network is freed, the emitters moreover being subject to a predetermined order of priority.

These methods of bit-by-bit collision detection which have the disadvantage of not optimizing the flow of information by systematically neutralizing the emission in the event of detection of a collision are not applicable in the case of a transmission within an electrical distribution circuit.

British Patent GB-2 229023A, filed in the name of Creda Limited, dated Mar. 6, 1989, discloses a system for remote control of electrical apparatus by carrier currents on an electrical distribution circuit, this system comprising a master processor and a bus controller which emit data packets towards remote applications. A method for avoiding the information collisions is proposed, the main characteristic being the sending by each appliance having received a data packet emitted by the processor of an acknowledgment of receipt after a predetermined time-span. This method, however, does not implement a bit-by-bit collision detection and does not guarantee that a defective message will be detected by the network.

European Patent EP-A-0 100 594, filed in the name of the Plessey Overseas Company, Ltd., dated Jun. 15, 1983, describes a local area network computer system provided with an anti-collision transmission management employing a priority signal consisting of either a binary number indicative of a measurement of the standby time of a station connected to the network, or of a number allocated to the station for this purpose, or of a combination of these two numbers. This type of collision management does not envision listening for the echo returned by the destination station. Furthermore, such a system cannot be applied to the area of carrier currents.

SUMMARY OF THE INVENTION

According to the invention, the method comprises a collision-detection step performed during the emission of each bit from said frame and containing a sub-step of reception of an echo bit of the emitted bit and a sub-step of comparison of the received bit with the emitted bit and a sub-step of comparison of the received bit with the remitted bit, leading in the event of detection of a collision, to the execution of a collision-management step in the course of which the stations involved in said collision are placed in a state of listening for a succession of items of information emitted on the electrical distribution circuit respectively of the other communication stations according to a predetermined order of priority.

Thus, with the management method according to the invention, by combining a priority management mode and a bit-by-bit collision detection technique, better utilization is obtained of the information medium by optimizing the flow of information emitted by the set of emitter communication stations connected to the electrical distribution circuit. Moreover, the reliability of the communications which are made by a bit-by-bit collision detection is judiciously accompanied by an improvement in the utilization factor of the information medium with respect to the prior art.

According to a preferred version of the invention, in the course of the collision-management step, that one of the other stations which has priority order immediately below that of the communication station presently emitting on the electrical distribution circuit, is subjected to a temporizing step of duration substantially equal to the duration of transmission of a frame.

This makes it possible to best effect a temporal juxtaposition of the necessary frames generated respectively by the communication stations according to the predetermined order of priority. The envisaged temporization prevents the relevant station from causing a new collision state in an inopportune manner.

According to an advantageous embodiment of the invention, in the course of the collision-management step, if an item of information emitted by the other communication stations relates to one of the two stations involved in the collision, this station executes the orders or commands possibly included in said item of information.

This thereby contributes to making from the collision-management step not only a step of arbitration and monitoring of the communications of the various communication stations, but also a sequence during which the communication stations involved in the collision and receiving information are able to execute the orders included in this information without having to wait for the end of the collision-management step. This necessarily contributes to greater effectiveness of the management method.

Furthermore, in the course of the collision-management step, the other communication stations which are not presently emitting are placed in a state of listening for information circulating on the electrical distribution circuit and execute the orders or commands possibly included in the information which is addressed to them.

The above-mentioned possibility, which was aimed at the communication stations involved in the collision and which relates to the execution by these stations of the commands received in the course of the collision-management step, is thus generalized to the set of communication stations.

According to another aspect of the invention, the device for managing information transmissions on an electrical distribution circuit, this information arising from several communication stations connected to the electrical distribution circuit and being emitted by injection of carrier currents on the latter in the form of frames comprising a predetermined number of bits emitted sequentially, implementing the method according to the invention, is such that it comprises means for detecting a collision of information on the electrical distribution circuit, cooperating with means for emitting on said circuit information delivered by monitoring means, said collision-detection means being arranged to deliver a collision-detection signal to the monitoring and processing means with a view to initiating the collision-management step.

The purpose of the present invention is to remedy the disadvantages of the prior art by proposing a method for managing information transmissions on an electrical distribution circuit, said information arising from several communication stations connected to said electrical distribution circuit and being emitted by injection of carrier currents on said electrical distribution circuit in the form of a frame comprising a predetermined number of bits.

Other features and advantages of the invention will emerge further in the description hereafter. In the attached drawings by way of non-limiting examples:

DETAILED DESCRIPTION OF THE INVENTION

A preferred embodiment of a management device according to the invention will now be described at the same time as the method employed in this device, by reference to FIGS. 1-7.

Figure 1:
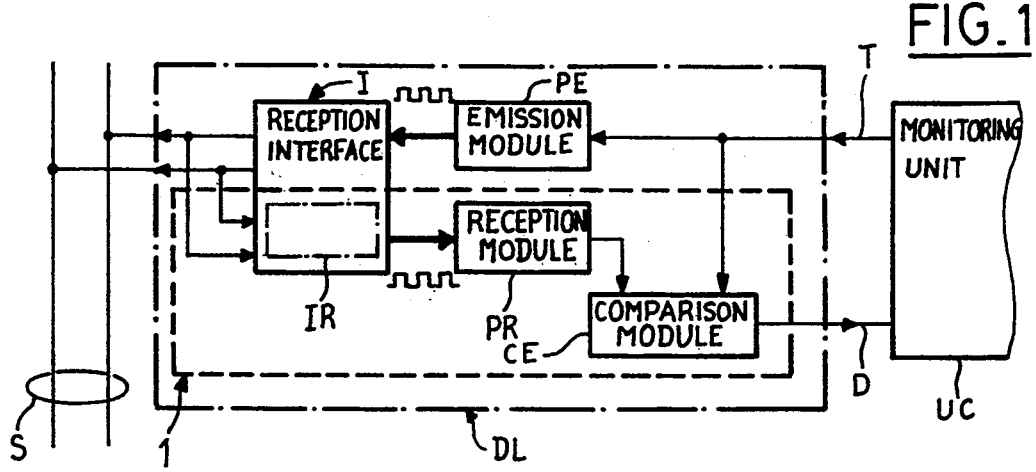
FIG. 1 is a simplified block diagram of a line control module incorporating the management device according to the invention.

Referring to FIG. 1, a line-control unit DL is considered, situated at the interface between an electrical distribution circuit S and a communication protocol monitoring unit UC equipping a communication station (not shown) associated with an item of electrical equipment intended to be controlled and to emit information via the electrical distribution circuit S. A patent application filed jointly with the present application aims precisely at a method for communicating information among several communication stations via an electrical distribution circuit, and a system for employing same, which includes in particular for each communication station a line-control unit.

In the embodiment of the invention illustrated in the figures, the line-control unit DL comprises an emission module PE receiving an item of information to be emitted originating from the protocol monitoring unit UC and effecting the shaping and conditioning thereof, and an injection interface I connected downstream toward the electrical distribution circuit S, which is, for example, a monophase mains circuit of effective voltage 220 V and of frequency 50 or 60 Hz, and upstream of the output of the emission module PE. The injection interface I effects, in accordance with well-known techniques, the injection of carrier currents modulated by a frame representing an item of information to be transmitted on the distribution circuit S.

Figure 2:
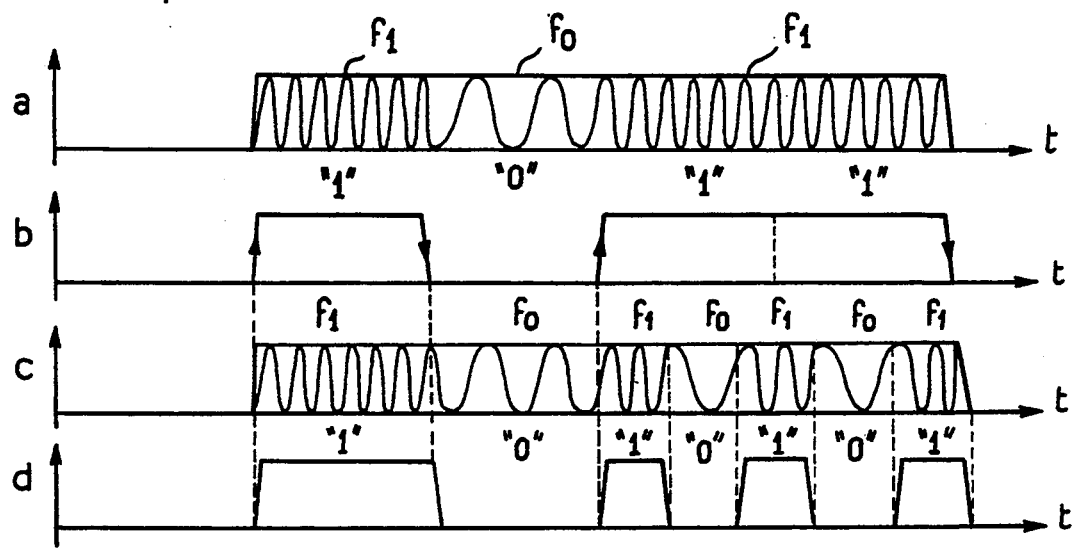
FIG. 2 is a time diagram illustrating the consequences of an information collision in the case of a frequency modulation of FSK type.

Two well-known modulation techniques can be employed: frequency modulation of FSK type ("Frequency Shift Key") and amplitude modulation of ASK type ("Amplitude Shift Key"). In the case of a modulation of FSK type, it is recalled, with reference to FIG. 2, that with each value "0," "1" of a bit to be transmitted there is associated a signal of predetermined frequency $f_0$, $f_1$, these two frequencies being sufficiently distinct. A frame is thus materialized through a signal of constant amplitude and of frequency taking one of the two predetermined values $f_0$, $f_1$, in a juxtaposition of sequences of constant duration, with which the various bits to be transmitted are associated. Thus, the timing diagram a) of FIG. 2 illustrates in simplified fashion the signal injected upon transmission of an item of serial digital information 1011 illustrated in logic form on the timing diagram b) of FIG. 2 and such that it can be picked up at the input of the injection interface I.

When the modulated signal is injected onto the electrical distribution circuit S, it then becomes available over the whole of this circuit for reception by the relevant communication stations. However, if another communication station simultaneously undertakes another emission, a resulting carrier signal will appear on the line and no longer corresponds to the initial signal emitted by the first emitter communication station.

To identify this state and manage these collisions, the line-control unit DL further comprises a management device 1 according to the invention which consists of a reception interface module IR coupled directly to the injection interface I and connected as input to the two output lines of the said injection interface I, a reception module PR receiving from the reception interface module IR an item of digital information obtained by demodulating the signal $R_x$ picked up on the distribution circuit S, and a module CE for comparison between each emitted bit and each received bit which constitutes an echo of an emitted bit.

This comparison module CE receives as input, on the one hand, the bits travelling in series from the monitoring unit UC, for example, a microprocessor, towards the emission module PE and, on the other hand, the bits obtained by demodulating the signal picked up at the point of injection into the distribution circuit S, and furthermore delivers a collision-detection signal D intended for the protocol-monitoring unit UC.

A bit-by-bit collision detection is thus available. The time diagram c) of the figure illustrates by way of example a signal c) received as echo and perturbed by a collision between several signal emissions. This signal leads after demodulation to an item of digital information 1010101 (time diagram d) manifestly different from the item of digital information 1011 emitted. On the first difference between emitted bit and received bit, the comparison module CE generates a collision-detection signal. The monitoring unit UC then undertakes execution of a collision-management step which will regulate the various emission sequences until there is no longer congestion in the distribution circuit S.

Figure 3:
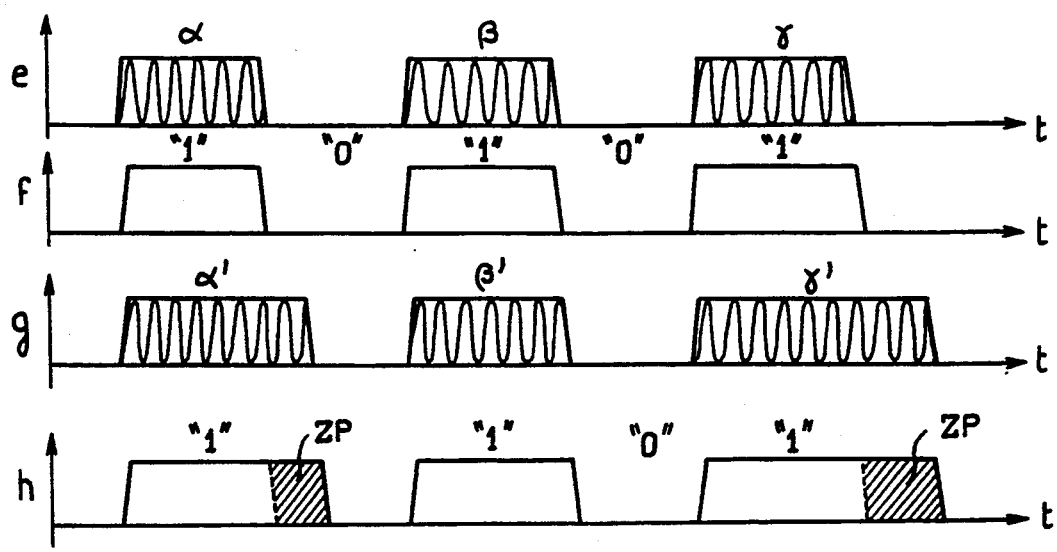
FIG. 3 is a time diagram illustrating the consequences of an information collision in the case of an amplitude modulation of ASK type.

An amplitude modulation of ASK type can also be imagined, with reference to FIG. 3. The time diagram e) represents a signal emitted in accordance with this modulation and corresponding to an item of digital information 10101 (time diagram f). In the given example, to a "1" bit there corresponds a sequence of non-zero amplitude and fixed frequency a, b, c and to a "0" bit there corresponds an absence of signal. In the event of a collision on the distribution circuit S, it is possible to obtain as resultant signal a perturbed signal illustrated by the time diagram g) and which comprises, for example, sequences a', c' associated with "1" bits and longer than the corresponding initial sequences a, c the sequence b' remaining, for example, of duration identical to that of the initial sequence b.

The consequence of this is to create perturbed zones ZP in the digital information received (time diagram h) which may lead to erroneous digital interpretations.

Figure 4:
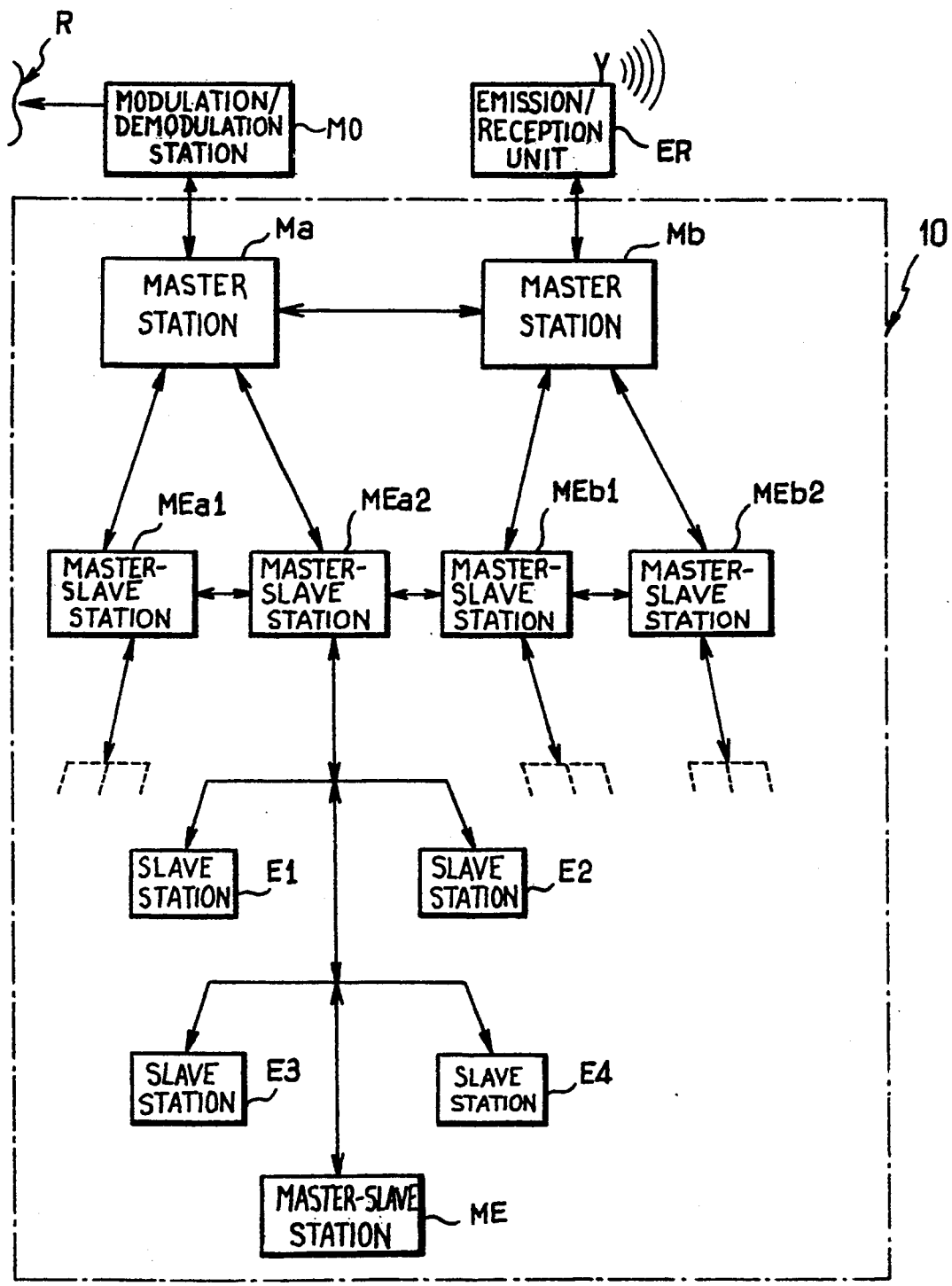
FIG. 4 is a block diagram illustrating the hierarchized organization of a method of communication including the management method according to the invention.

The hierarchized structure 10 of a communication system in which the method according to the invention is employed is represented in simplified manner in FIG. 4 in which are represented the communication possibilities among the various stations and the information exchanges among these stations, and not the hardware links which are not in any case direct inter-station, since the mains S constitutes the sole hardware medium for inter-station exchanged information.

By way of example, the structure represented comprises two Master stations Ma, Mb within a dwelling, one of the stations being connected to an external communication network R via a modulation/demodulation unit MO and the other being in communication with external communication systems (not shown) via an emission/reception unit ER, for example, of HF (high frequency) type.

The two Master stations Ma, Mb constitute the first layer of the system, the second layer being constituted by Master-Slave stations MEa1, MEa2 and MEb1, MEb2 which can communicate with one another, with the Master station Ma, Mb on which each is dependent, and with a set of Slave stations E1, E2, E3, E4 dependent on each Master-Slave station and which constitute the third layer of the system.

With each Master station Ma, Mb there is associated a set of Master-Slave stations MEa1, MEa1; MEb1, MEb2, each Master-Slave station able to control a set of Slave stations which can also be controlled by another Master-Slave station ME.

The bidirectional character of the communications, on the one hand between the Master stations and on the other hand, between the Master stations and the Master-Slave stations, and the exclusively monodirectional nature of the communications between the Master-Slave stations and the Slave stations should be noted.

Furthermore, it will be possible without any problem to use the conventional modulation techniques by carrier currents, in particular modulations of FSK or ASK type described earlier.

Specifically, each station is materialized through a circuit whose structure and complexity depend on the nature of the station, and which is housed either directly within items of equipment to be controlled or within special programming modules or even in a base for monitoring the communication system.

The manner in which the information is conditioned will now be described in more detail.

Figure 5:
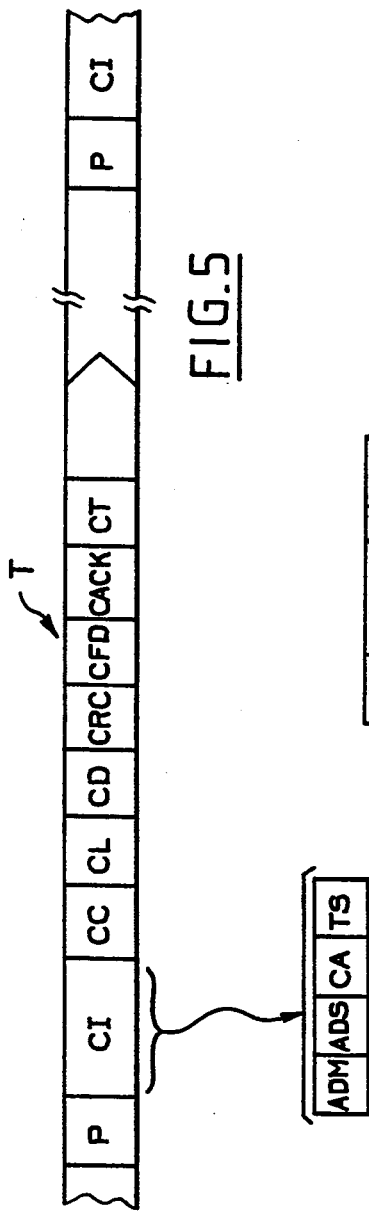
FIG. 5 illustrates the structure of a frame generated in a home communication system.

With each frame transmitted T there corresponds, with reference to FIG. 5, a preamble P, and the succession of fields mentioned below:
identification field CI
control field CC
data demarcation field CL
data field CD
coding field CRC
end-of-data field CFD
recognition field CACK
end-of-frame field CT It should be noted that the coding field CRC consists of a polynomial of degree n, in accordance with a well known technique.

Figure 6:
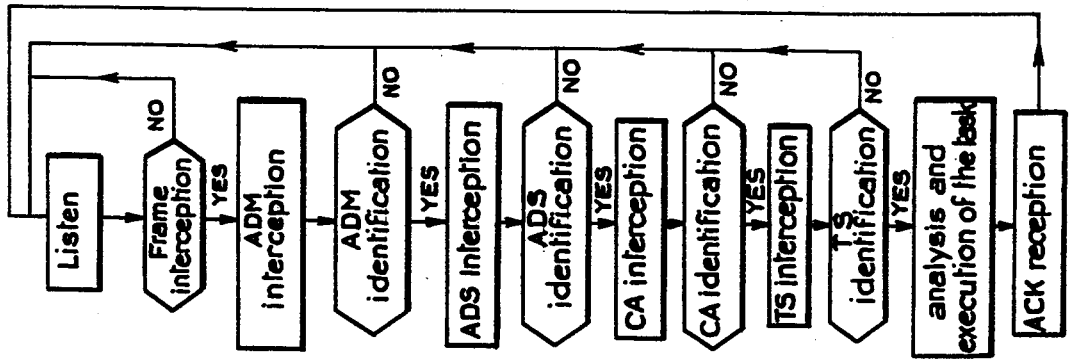
FIG. 6 is a flowchart of a listen sequence employed in a communication method.

The identification field CI itself comprises:
an address of the house ADM
an address of the station in the house ADS
an access code CA
a code representative of the type of station TS Within a home system employing the method according to the invention, each Master-Slave or Slave station is permanently in a state of listening on the mains, as illustrated in the flowchart of FIG. 6.

As soon as the existence of an overlaid frame is detected on the mains, an interception of the address field ADM is performed. If this address is precisely the address of the house in which the listening station is located, an interception of the station address field ADS is undertaken with the objective of detecting a command intended for the listening station. If this is the case, an interception of the access code CA is performed and makes it possible to safeguard the transmission of an order intended for an item-of equipment. The following interception of the type of station is an additional identification procedure.

On termination of the processing of the identification field, analysis of the control field CC and of the data field CD and conformity of the field CRC lead to the execution of the task commanded. After reception of the recognition field CACK, the transmission of the frame is terminated.

Figure 7:
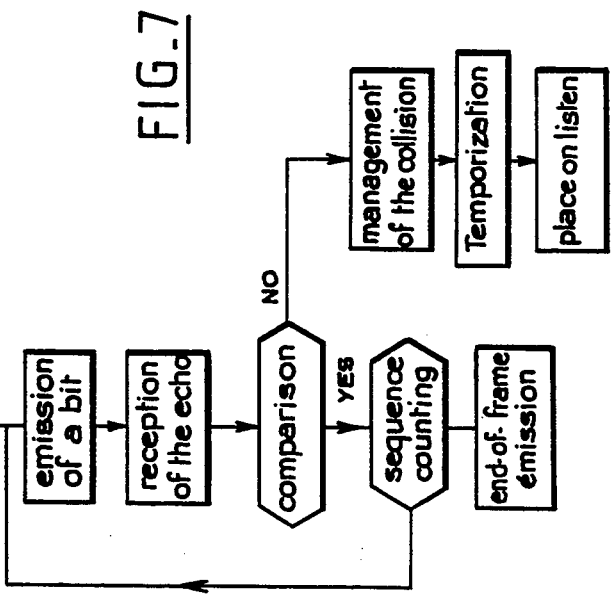
FIG. 7 is a flowchart of an elementary emission sequence employed in the method according to the invention.

In the method according to the invention, the stations of the system which are designed to emit frames and more generally information on the mains, namely the Master stations and the Master-Slave stations, effect the emission of this information according to a procedure incorporating a collision detection, with reference to FIG. 7.

After a preliminary initialization step, each bit of the frame is emitted on the mains and its echo is received and then compared with the emitted bit. If the comparison indicates a correct transmission, the following bit of the frame is emitted until the whole frame has been emitted. When the number of sequences corresponding to the total number of bits of the frame has been reached, an end-of-frame emission step is undertaken. If the comparison reveals a difference between the emitted bit and the bit received as echo, then a step of management of the collision thus detected is undertaken. It leads to a placing on listen for a predetermined temporizing duration which permits the occupancy condition of the mains to be detected. When the line is again free, a new emission of the frame is undertaken, as a function of a predetermined order of priority between emitter stations.

By way of exemplary home application of the method according to the invention, a daily program containing the following sequence can be cited:

I) locking of the doors
II) surveillance of an alarm system
III) reduction in thermostat settings
IV) reading the consumption of fuel-oil
V) reception of a telephone call
VI) switching on of equipment The above-mentioned sequences I, II, III, and IV are managed by specific Master-Slave stations. Reception and processing of telephone calls are performed by the Master station which is connected to a modem.

Each electrical lock constitutes a Slave station. The same is true for each sensor of the alarm system, for the various elements of the heating system and for all or some of the home equipment to be controlled.

Commands can of course be transmitted to the Master-Slave stations by infrared or microwave methods.

Naturally, the invention is not limited to the examples described, and numerous developments can be made to these examples without exceeding the scope of the invention.

Thus, types of modulation other than present-day modulations by carrier currents of FSK or ASK type can be imagined. Moreover, the number of stations which can be managed is not limited by the invention, but solely by the processing capacities of the Master or Master-Slave stations.

It is claimed:

1. A method for managing information transmissions on an electrical distribution circuit, said information, including selected items of information, arising from several communication stations connected to said electrical distribution circuit said information being emitted by injection of carrier currents on said electrical distribution circuit in the form of frames comprising a predetermined number of bits emitted sequentially, the communications stations having a predetermined order of priority comprising the steps of:

performing a collision-detection step in the course of the emission of each bit of information emitted from a first one of the communication stations by receiving an echo bit of the emitted bit and comparing said echo bit with the emitted bit to determine if the emitted bit has collided with a bit emitted by a second one of the communication stations on the distribution circuit; and in the event of a collision, performing a collision-management step by placing the first and second stations in a state of listening, in which each of the first and second stations listen for a succession of items of information emitted on the electrical distribution circuit by communication stations other than the first or second communication stations.

2. The method as claimed in claim 1 wherein transmission of each frame onto the electrical distribution circuit takes a predetermined period of time and, in the course of the collision-management step, a station which has a priority in the predetermined order of priority immediately below that of the first communication station presently emitting on the electrical distribution circuit is placed in a waiting condition for a period of time substantially equal to the predetermined time for transmission of a frame.

3. The method as claimed in claim 2 wherein some of the items of information include orders or commands for execution by one or more of the communication stations and wherein, in the course of the collision-management step, if one of said items of information emitted by said communication stations other than the first or second communication station includes an order or command for execution by the first or second station, the first or second station respectively executes the order or command included in said one of said items of information.

4. The method as claimed in claim 3 wherein in the collision-management step, any communication stations which are not presently emitting are placed in a state of listening for items of information circulating on the electrical distribution circuit and wherein if any order or command is included in the items of information and is addressed to one of said communications station not presently emitting information onto the electrical distribution circuit, said one of the stations not presently emitting information onto the electrical distribution circuit executes said order or command.

5. The method as claimed in claim 2, wherein the collision-management step ends when no communication station is in the waiting condition.

6. The application of the method as claimed in claim 1 to communications in a home system comprising several communication stations connected to an electrical distribution circuit.

* * * * *